United States Patent Office 2,742,399
Patented Apr. 17, 1956

2,742,399

PRODUCTION OF DEXTRANASE

Henry M. Tsuchiya and Allene R. Jeanes, Peoria, Helen M. Bricker, Chicago, and Carl A. Wilham, Peoria, Ill., assignors to the United States of America as represented by the Secretary of Agriculture No Drawing. Application August 24, 1951,
Serial No. 243,572

9 Claims. (Cl. 195—31)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the production of dextranase, an enzyme capable of hydrolyzing dextran to its monomer glucose or to intermediate oligosaccharides, and to methods for carrying out such enzymic hydrolyses of dextran.

Dextran is a carbohydrate produced by the bacterial action of such organisms as *Leuconostoc mesenteroides*, *Leuconostoc dextranicum*, and related organisms. It possesses a structural configuration by virtue of which a variety of valuable hydrolytic products are possible. Prior methods of hydrolyzing dextran by acid have the disadvantage that cleavage of the dextran molecule is random in character. The hydrolysis of dextran may be accomplished enzymatically, but heretofore no practical method has been suggested for producing the enzyme in sufficient quantity or of sufficient potency to render enzymatic hydrolysis practically feasible.

Prior workers have found that such microorganisms as *Penicillium funiculosum* and *P. lilacinum* produce endocellular dextranase after an incubation period of 10 days. However, these earlier reports have taught that the enzyme can be recovered only by mechanical disintegration of the cells of these organisms, such as by tedious grinding with sand or powdered glass.

We have discovered, contrary to the prior reports, that a substantial amount of dextranase is produced extracellularly by certain strains of *P. lilacinum, P. funiculosum, P. verruculosum*, and *Spicaria violacea*, and that the dextranase, secreted into the surrounding medium by these organisms, can be recovered therefrom in good yield and potency. This advantageous characteristic is generally true of the individual strains of each of the enumerated species, even though certain strains may fail to produce dextranase. We have, moreover, determined that the enzyme solutions recoverable from the culture media are much more active within certain ranges of acidity as will be disclosed in detail in the following specification.

The dextranase products produced in accordance with our invention are capable of hydrolyzing dextran to give useful products such as the monosaccharide, glucose; the disaccharide, isomaltose; and higher oligosaccharides. They are characterized by yielding large quantities of isomaltose, partly by reason of the peculiar molecular structure of dextran, and we evaluate the potency of our products in terms of isomaltose produced from a given dextran solution in a given time.

According to our invention, an organism from the genus Penicillium, capable of producing dextranase, such as those previously enumerated, is cultured in a medium containing dextran and a source of assimilable nitrogen for three to six days instead of the ten days required by previous workers. At the end of the culture period, the mycelial cells may be separated, and the culture medium may then be used directly to hydrolyze dextran.

Inasmuch as the common sources of assimilable nitrogen such as corn steep liquor, yeast autolysate, liver extract and the like, contain essential mineral nutrients and growth factors, it is usually unnecessary to add salts. However, it is advantageous under some circumstances to employ chemically defined media containing pure nitrogen compounds, such as sodium nitrate. In such cases, the medium is supplemented with small amounts of the essential salts, such as magnesium sulfate, iron citrate, manganese sulfate, zinc sulfate and copper sulfate, potassium phosphate and calcium chloride.

The culture medium is prepared containing 0.5 to 5.0 percent dextran, 0.25 to 3.0 percent nitrogen source, and, in the case of the chemically defined media, essential salts. The medium is then inoculated with the dextranase-producing organism, and the fermentation conducted at a pH of 4.0 to 9.0 for three to six days. At the end of the fermentation the cells of the organism are separated, and the liquor may be employed to hydrolyze dextran solutions.

The hydrolysis is carried out under slightly acidic conditions, as for example, between a pH of 3.0 to 6.5. However, we have obtained optimum results conducting the hydrolysis between pH 4.5 and 5.5. The temperature of the hydrolysis is preferably between 30° C. and 50° C.

The following specific examples illustrate the invention.

EXAMPLES 1 TO 11

A number of individual strains of organisms as tabulated below were cultured as follows:

A culture medium consisting of 2.0 percent dextran and 3.0 percent corn steep liquor (dry basis) was sterilized and inoculated with a 5-percent inoculum of the organism. One hundred ml. of culture was placed in 1-liter Erlenmeyer flasks. The initial pH of the fermentation was 5.2.

After being shaken at 30° C. for 5 days, the mycelial cells were separated from the liquors and assays were made by the following procedure.

To 10 ml. of a buffered substrate, containing 0.15 M sodium acetate and 250 mg. of dextran at pH 5.2, was added 5.0 ml. of the enzyme-containing liquors. The reaction mixtures were incubated for 2 hrs. at 40° C., whereupon the increase in reducing power of the reaction mixture was measured, calculated as milligrams of isomaltose produced per ml. of the liquors per hr. These values will hereinafter be referred to as dextranase units. The results are tabulated below.

Table I

| Ex. No. | Organism | Units of dextranase |
|---|---|---|
| 1 | *Penicillium lilacinum* N R R L 895 | 36.5 |
| 2 | *P. lilacinum* N R R L 1185 | 37.1 |
| 3 | *P. lilacinum* N R R L 1194 | 36.7 |
| 4 | *P. lilacinum* N R R L 1746 | 36.7 |
| 5 | *P. funiculosum* N R R L 1033 | 34.3 |
| 6 | *P. funiculosum* N R R L 1034 | 0.0 |
| 7 | *P. funiculosum* N R R L 1132 | 41.1 |
| 8 | *P. verruculosum* N R R L 2135 [1] | 42.9 |
| 9 | *P. funiculosum* N R R L 1032a | 40.1 |
| 10 | *P. funiculosum* N R R L 1768 | 23.5 |
| 11 | *Spicaria violacea* N R R L 1691 | 39.3 |

[1] 100 ml. of culture in 500 cc. Erlenmeyer flask.

The foregoing data show qualitatively the character of the culture liquors. It is interesting to note that some strains, such as Example No. 6, fail to produce extracellular dextranase. This may be attributed to the inherent characteristics of that particular strain of organism. The capabilities of an organism for producing extracellular enzyme are very easily detectable by the procedure of the foregoing examples.

EXAMPLE 12

Four identical culture media consisting of 2 percent dextran and 3 percent corn steep liquor (dry basis) were inoculated with 5 percent liquid inoculum of *P. funiculosum* NRRL 1132. The pH was adjusted as shown in Table II, and the fermentation carried out at 30° C. with aeration for 5 days. At the end of the fermentation period, each culture liquor was assayed as in the foregoing examples. The results are tabulated below.

*Table II*

| Run No. | pH | Dextranase units |
|---|---|---|
| 1 | 5.0 | 156.8 |
| 2 | 6.0 | 166.8 |
| 3 | 7.0 | 230.1 |
| 4 | 8.0 | 247.0 |

EXAMPLE 13

A culture medium of 100 cc. was made up as follows:

Two ml. each of solutions A, B, and C.
  Solution A, 3% $CaCl_2 \cdot 2H_2O$
  Solution B, 10% $KH_2PO_4$
  Solution C, 5% $MgSO_4 \cdot 2H_2O$ + 0.125% iron citrate hydrate + 0.015% $MnSO_4 \cdot 4H_2O$ + 0.02% $ZnSO_4 \cdot 7H_2O$ + 0.02% $CuSO_4 \cdot 5H_2O$ + 10.0% NaCl
1% dextran
0.15% $NaNO_3$ The initial pH was adjusted to 6.0, and the medium was inoculated with 5 percent inoculum of *P. funiculosum* NRRL 1768. The fermentation was continued for 5 days, whereupon the culture liquor was evaluated, and found to contain 750 units of dextranase.

Our enzyme preparations, as previously noted, are particularly useful in the hydrolysis of dextran to the mono- and disaccharides, glucose and isomaltose. The following examples illustrate employing the enzyme-containing culture filtrates for that purpose. Hydrolyses were carried out under approximately the same conditions as those used for the assay procedure.

For example, an aqueous solution of dextran, of 2 to 10 percent concentration, is adjusted to pH 3.0 to 6.5 and subjected to the action of the dextranase. The enzyme may be added in the form of the crude culture filtrate. We have obtained good results by adding about 15 to 25 percent by volume of the crude filtrate.

The preferred range of acidity for the hydrolysis is pH 4.5 to 6.0, and the culture filtrate may be diluted extensively. However, substantial dilution reduces the degree of conversion or increases the time required, or both.

By varying the ratio of substrate to enzyme, the temperature, the length of hydrolysis time and the pH, the ratio of hydrolytic products may be varied from largely mono-, di-, and trisaccharides, to products of relatively high molecular weight. The ratio of mono-, di- and trisaccharides obtained is also somewhat dependent on the organism producing the enzyme, for example, some organisms give very little glucose and considerable trisaccharide. Others give largely disaccharide, the amounts of mono- and trisaccharides being much smaller. Also, the hydrolyzates contain substantial amounts of saccharides having 4, 5, 6, and more glucose units per molecule.

The products of the hydrolysis, particularly the monosaccharide, disaccharide, and trisaccharide fractions may be recovered from the hydrolyzate by adsorption. For example, the hydrolyzate may be slurried with active carbon or passed through a carbon-celite column, whereupon the saccharides are adsorbed in varying degrees of intensity. Pure isolates may be obtained by elution with aqueous phenol, alcohol or the like.

The characteristic products produced by the enzymes of the 5 microorganisms of this invention may be summarized generally as follows.

*Table III*

| Mold | Relative order of quantity of sugars in product | Comments |
|---|---|---|
| *P. lilacinum* NRRL 895 | (1) disaccharide [1] (2) trisaccharide (3) glucose | Glucose in very small amount. |
| *P. funiculosum* NRRL 1132 | (1) disaccharide (2) trisaccharide (3) glucose | Enzyme more active than that from *P. lilacinum*. |
| *P. funiculosum* NRRL 1768 | (1) disaccharide (2) trisaccharide (3) glucose | Glucose almost absent. |
| *P. verruculosum* NRRL 2135 | (1) disaccharide (2) glucose (3) trisaccharide | Essentially no trisaccharide produced. |
| *S. violacea* NRRL 1691 | (1) disaccharide (2) glucose (3) trisaccharide | Inferior enzyme activity. |

[1] The disaccharide in this table is isomaltose.

The following specific examples illustrate the hydrolysis procedure.

EXAMPLE 14

One hundred grams of dextran, produced from *Leuconostoc mesenteroides* NRRL B-512 was dissolved in 1565 cc. of sodium acetate-acetic acid buffer of 0.01125 molarity (pH 5.2). To this solution was added 750 cc. of water, and the solution maintained at 40° C. while 978 cc. of the crude enzyme-containing culture filtrate from Example 13 was added together with an equal volume of water.

The course of the hydrolysis was followed through reducing determinations made on aliquots of the hydrolysis mixture. The relative amounts of the various reducing sugars present in the hydrolyzate were determined by quantitative paper chromatography. The data are shown in Table IV.

*Table IV*

| Hydrolysis time, hrs. | Mg. dextrose equivalent per cc. of hydrolyzate | Reducing power calc'd. as isomaltose, Percent Theory | Composition of hydrolyzate, percent | |
|---|---|---|---|---|
| | | | Isomaltose | Trisaccharide |
| 2 | 6.3 | 71 | 35 | 25 |
| 3 | 6.6 | 74 | | |
| 4 | 6.8 | 77 | 42 | 25 |
| 6 | | | 43 | 20 |

The 4-hr. hydrolyzates were fractionated on carbon-Celite columns, giving the yields of sugars in solution as follows: Glucose, 3.7 percent; isomaltose, 45 percent; and trisaccharide, 22 percent. The sugars were isolated from their respective solutions by concentration. The isomaltose and the trisaccharide were found to be present in state of high purity.

EXAMPLE 15

The ratio of disaccharide to trisaccharide may be varied by any of a number of methods, as previously noted. The following example illustrates one method of increasing the disaccharide content of the hydrolyzate by adding a supplementary amount of enzyme during the hydrolysis period.

One hundred grams of dextran from *Leuconostoc mesenteroides* NRRL B-512 was dissolved as in Example 14. One thousand cc. of the enzyme-containing culture filtrate from Example 13 was diluted with an equal volume of water, adjusted to pH 5.2, warmed to 40° C., and then added to the dextran buffer solution. After hydrolysis had proceeded for 3 hrs., half of the solution was withdrawn, and to it was added 180 cc. of enzyme culture filtrate. Hydrolysis of both portions of the solution was continued for an additional 3 hrs. The results are shown in Table V.

Table V

| Hydrolysis Solution, 6 hrs. Reaction Time | Theoretical conversion to isomaltose, percent | Composition of hydrolyzate, percent | |
|---|---|---|---|
| | | Isomaltose | Trisaccharide |
| No additional enzyme | 83 | 49 | 16 |
| Additional enzyme added | 86 | 50 | 9 |

EXAMPLE 16

Example 14 was repeated, except that the enzyme-containing culture filtrate from Example 12 was used. Reducing determinations showed 94 percent conversion to isomaltose. Quantitative paper chromatographic analysis of the hydrolyzate showed the presence of 9 percent glucose, 52 percent isomaltose, and 7 percent trisaccharide. The hydrolyzate was fractionated on carbon-Celite columns, the yields being 11 percent glucose, 53 percent isomaltose, and 7 percent trisaccharide.

We claim:

1. The method for producing a dextranase product comprising cultivating an extracellular dextranase-producing strain of a microorganism of the group consisting of *Penicillium lilacinum* NRRL 895, *P. lilacinum* NRRL 1185, *P. lilacinum* NRRL 1194, *P. lilacinum* NRRL 1746, *P. funiculosum* NRRL 1033, *P. funiculosum* NRRL 1132, *P. verruculosum* NRRL 2135, *P. funiculosum* NRRL 1032a, *P. funiculosum* NRRL 1768, and *Spicaria violacea* NRRL 1691 in a medium containing dextran and a source of assimilable nitrogen for 3 to 6 days at a pH within the range of 4.0 to 9.0, and separating the mycelial cells from the culture medium thereby producing a dextranase containing culture filtrate.

2. Method of claim 1 in which the dextran is present in the culture medium in amount of 0.5 to 5.0 percent, and the assimilable nitrogen source is present in an amount of 0.25 to 3.0 percent.

3. Method of claim 2 in which the organism is *P. lilacinum* NRRL 895.

4. Method of claim 2 in which the organism is *P. funiculosum* NRRL 1132.

5. Method of claim 2 in which the organism is *P. verruculosum* NRRL 2135.

6. Method of claim 2 in which the organism is *P. funiculosum* NRRL 1768.

7. Method comprising cultivating an extracellular dextranase-producing strain of a microorganism of the group consisting of *Penicillium lilacinum* NRRL 895, *P. lilacinum* NRRL 1185, *P. lilacinum* NRRL 1194, *P. lilacinum* NRRL 1746, *P. funiculosum* NRRL 1033, *P. funiculosum* NRRL 1132, *P. verruculosum* NRRL 2135, *P. funiculosum* NRRL 1032 a, *P. funiculosum* NRRL 1768, and *Spicaria violacea* NRRL 1691 in a medium containing dextran and a source of assimilable nitrogen for 3 to 6 days at a pH within the range of 4.0 to 9.0, and separating the cells from the culture medium, contacting 15 to 20% by volume of the resulting cell-free culture medium with a 2 to 10% solution of dextran at pH 3.0 to 6.5 and at a temperature of 30 to 50° C. for a period of 2 to 6 hours, whereby the dextran is hydrolyzed, and recovering the hydrolysis products from the solution.

8. Method of claim 7 in which the pH of hydrolysis is within the range of 4.5 to 6.0.

9. Method of claim 8 in which the hydrolysis time is approximately 4 hours.

References Cited in the file of this patent

UNITED STATES PATENTS

| 1,391,219 | Takamine | Sept. 20, 1921 |
| 1,460,736 | Takamine | July 3, 1923 |
| 2,119,981 | Baker | June 7, 1938 |
| 2,364,590 | Schopmeyer | Dec. 5, 1944 |

OTHER REFERENCES

Chemical Abstracts 43:3050 i, Nordstrom and Hultin.
Chemical Abstracts 43:4307 g, Ingleman.
Chemical Abstracts 44:7382 g, Hultin and Nordstrom.
Hultin and Nordstrom, Investigations on Dextranase, Acta Chem. Scand., 3, (1949) pp. 1405–1417.